(12) United States Patent
Ponnuru et al.

(10) Patent No.: US 12,526,236 B2
(45) Date of Patent: Jan. 13, 2026

(54) PER-QUEUE NETWORK PERFORMANCE MEASUREMENT MAPPING

(71) Applicant: Cisco Technology, Inc., San Jose, CA (US)

(72) Inventors: Laxmikantha Reddy Ponnuru, San Ramon, CA (US); Arul Murugan Manickam, San Jose, CA (US); Sanjay Sreenath, San Jose, CA (US); Hongbo Xia, Shanghai (CN); Yajun Chen, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 35 days.

(21) Appl. No.: 18/388,351

(22) Filed: Nov. 9, 2023

(65) Prior Publication Data

US 2025/0062994 A1 Feb. 20, 2025

Related U.S. Application Data

(60) Provisional application No. 63/532,807, filed on Aug. 15, 2023.

(51) Int. Cl.
*H04L 41/5009* (2022.01)
*H04L 47/11* (2022.01)
*H04L 47/2408* (2022.01)

(52) U.S. Cl.
CPC ...... *H04L 47/2408* (2013.01); *H04L 41/5009* (2013.01); *H04L 47/11* (2013.01)

(58) Field of Classification Search
CPC ... H04L 47/2408; H04L 41/5009; H04L 47/11
See application file for complete search history.

(56) References Cited

U.S. PATENT DOCUMENTS

| | | | |
|---|---|---|---|
| 8,437,255 B2 | 5/2013 | Jiang | |
| 9,197,495 B1 | 11/2015 | Rauser et al. | |
| 11,792,096 B1* | 10/2023 | Munn | H04L 43/0817 709/224 |
| 2003/0088529 A1 | 5/2003 | Klinker et al. | |
| 2007/0156919 A1* | 7/2007 | Potti | H04L 63/12 709/238 |

(Continued)

FOREIGN PATENT DOCUMENTS

WO WO2022176266 8/2022

*Primary Examiner* — Dhairya A Patel
*Assistant Examiner* — Sujana Khakural
(74) *Attorney, Agent, or Firm* — Lee & Hayes, P.C.

(57) ABSTRACT

Techniques described herein can perform per-queue network performance measurement mapping, in which per-queue network performance measurements are determined and then mapped back to service level agreement (SLA) classes assigned to use the queues. Network traffic associated with an SLA class can be processed through an assigned router queue. Wide area network (WAN) as well as local performance measurements from the assigned queue can be combined to determine a combined performance measurement associated with the assigned queue. The combined performance measurement can then be mapped or otherwise associated with the SLA class. Similarly, combined performance measurements can be determined for other router queues and mapped or otherwise associated with other SLA classes.

20 Claims, 8 Drawing Sheets

(56) References Cited

U.S. PATENT DOCUMENTS

| | | | |
|---|---|---|---|
| 2007/0268909 A1* | 11/2007 | Chen | H04L 47/70 370/395.21 |
| 2008/0002678 A1* | 1/2008 | Klessig | H04L 41/0803 370/389 |
| 2013/0283379 A1* | 10/2013 | McDysan | H04L 63/0272 726/23 |
| 2015/0156082 A1* | 6/2015 | Kakadia | H04L 47/30 709/223 |
| 2016/0057062 A1* | 2/2016 | Heinz | H04L 47/15 370/235 |
| 2017/0308394 A1 | 10/2017 | Zheng et al. | |
| 2020/0153701 A1* | 5/2020 | Mohan | H04L 41/5009 |
| 2020/0382404 A1* | 12/2020 | Thangavel | H04L 43/0817 |
| 2022/0150759 A1* | 5/2022 | Han | H04W 28/0263 |
| 2023/0035653 A1 | 2/2023 | Rodolfo et al. | |

* cited by examiner

PER-QUEUE NETWORK PERFORMANCE MEASUREMENT MAPPING

CROSS REFERENCE TO RELATED APPLICATION

This application claims the benefit of U.S. Provisional Application No. 63/532,807 filed Aug. 15, 2023, and entitled "MEASURING PER-QUEUE LEVEL PERFORMANCE METRICS AND MAPPING THE METRICS TO SERVICE-LEVEL AGREEMENT CLASSES," the contents of which are hereby incorporated herein by reference in their entirety.

TECHNICAL FIELD

The present disclosure relates generally to communication networks, and to evaluating performance of network traffic in particular.

BACKGROUND

A network router can comprise multiple different traffic queues. Network packets forwarded via a first queue can wait in the first queue until forwarded toward their destinations by the router, network packets forwarded via a second queue can wait in the second queue until forwarded toward their destinations by the router, and so on.

Different queues can optionally be used for different traffic types. For example, the first queue may be used for network traffic associated with a first service level agreement (SLA) class, the second queue may be used for network traffic associated with a second SLA class, and so on. Applications that are assigned to the first SLA class may therefore be served primarily by the first queue, while applications that are assigned to the second SLA class may be served primarily by the second queue, and so on. In this scenario, techniques are needed to better understand per-queue performance and to map or correlate per-queue performance information back to the SLA classes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques that can be performed in connection with per-queue network performance measurement mapping, in which per-queue network performance measurements are determined and then mapped back to the SLA classes assigned to use the queues. According to an example embodiment, a method can be performed by a computing device. The method can associate network performance at multiple different router queues with SLA classes configured to use the router queues.

The method can comprise, for a first SLA class that is configured to use a first differentiated services code point (DSCP) which is processed through a first router queue, combining a first wide area network (WAN) performance measurement associated with the first DSCP with a first local performance measurement associated with the first router queue, resulting in a first combined performance measurement. The first combined performance measurement can then be mapped or otherwise associated with the first SLA class.

The method can further comprise, for a second SLA class that is configured to use a second DSCP which is processed through at least a second and a third router queue, combining a second WAN performance measurement associated with the second DSCP with a second local performance measurement associated with the second router queue, resulting in a second combined performance measurement. The second WAN performance measurement associated with the second DSCP can comprise a combined WAN performance measurement based on router queues associated with the second DSCP. The second combined performance measurement can then be mapped or otherwise associated with the second SLA class.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

Example Embodiments

In software defined wide area network (SDWAN) edge routers, there are two general groups of settings or parameters that can be configured for each class or group of applications, in order to improve quality of experience (QoE) of applications. First, each class of applications can be provisioned with SLA thresholds, e.g., loss, latency, and jitter thresholds, which are performance metrics that applications can tolerate without experiencing quality issues. Second, each class of applications can be configured with a quality of service (QoS) policy, which defines local queue mapping and a DSCP value that can be used for tunnel traffic, and which allows service providers to provide different levels of service quality.

For example, for real-time voice (RT Voice) applications, one could define the below example SLA and QoS policies:
SLA: loss 2%, latency 100 milliseconds (ms), jitter 50 ms
QOS Parameters: rt-voice-forwarding-class mapping—Queue0; DSCP value set to expedited forwarding (EF)

As each router queue can be configured with a different scheduling algorithm and bandwidth allocation, different queues can introduce different amounts of loss/latency/jitter when there is congestion. Also, each service level class (which maps to DSCP value) that customers buy from service providers can also provide different loss/latency/jitter guarantees. As a result, performance metrics can be dependent on both queue and DSCP value.

This disclosure therefore provides techniques that can be applied at the SDWAN edge, such as in router devices and router functions, to measure the performance metrics on each network path/tunnel, at a per queue and per DSCP level. Such granularly determined performance metrics can then be mapped to tunnel SLA's. The resulting data can be used for example by router/edge devices and functions, which can be configured to select an SLA path to send application traffic, thereby providing improved quality of experience for application users.

Further aspects of this disclosure include innovative methods to accurately measure loss and latency/jitter, per path/tunnel and per queue/DSCP level. The resulting measurements can be mapped to SLA classes associated with different tunnels.

Some embodiments can perform metric measurements at a per-queue level, followed by accurately mapping per-queue/DSCP level metrics to SLA classes. Traffic associated with different classes of applications (real-time-audio, real-time-video, transactional-data, bulk-data, etc.) can be mapped to different app-probe-class (APC) classifications, which can define local queues for the traffic as well DSCP values to be set for the traffic when sending the (tunnel) traffic over a WAN circuit.

An assigned queue will influence the loss/latency/jitter of traffic processed through the queue. Each local queue can be configured with a different bandwidth allocation, priority, and scheduling algorithm, based on, e.g., the type of applications that are mapped to that queue, and the rate of traffic generated from those applications. As a result, the packet drop criteria (loss) and scheduling (latency/jitter) can be different on different queues when there is a local congestion. The packet drop due to local queue congestion is referred to herein as local-loss.

An assigned DSCP can also influence the loss/latency/jitter. On private WAN circuit such as a multiprotocol label switching (MPLS) network, customers can purchase different classes of service from service providers. The different classes of service provide different levels of SLA guarantees for loss, latency and jitter. These classes of service can be mapped to different DSCP values. In contrast, on a public internet WAN circuit, typically there is no differentiated service, and all application traffic is treated equally. The packet drop (loss) and latency/jitter experienced via a WAN can therefore be different depending on the type of circuit and class of service. Packets that get dropped for any reason, whether congestion, network flaps, or otherwise, in a service provider network is referred to herein as wan-loss.

Given the loss can be different depending on an assigned local queue and DSCP value, embodiments of this disclosure can measure local-loss and wan-loss separately at a per-queue level, and the resulting measurements/metrics can be mapped to SLA classes. Similarly, latency/jitter can also be different depending the on local queue and DSCP value, and so embodiments can also measure latency/jitter at a per-queue level and can map the resulting metrics to SLA classes.

Per-queue loss and latency/jitter measurements can be made according to any available measurement techniques, and embodiments of this disclosure need not necessarily use any particular measurement technique. An example per-queue loss measurement technique is described below. The disclosed technique can conduct per tunnel and per-queue level local-loss and wan-loss measurements.

Loss measurement can use a per-queue sequence number for each packet, to detect local-loss and wan-loss for each tunnel. In the case of an internet protocol secure (IPSEC) tunnel, there is already a per-queue sequence number space (SNS) to handle anti-replay detection, and this space can be leveraged for loss measurement. In case of a generic routing encapsulation (GRE) tunnel, a metadata header for each packet can include the sequence number.

A per-queue sequence number can be split into two parts, a monitor-id and a monitor-sequence. A receiver can dynamically adjust the values of each part depending on a rate of traffic, and the receiver can synchronize these with a sender along with drop statistics, so that the sender can calculate local-loss and wan-loss separately on a per-queue level.

Example per-queue latency and jitter measurement techniques, which can be used in connection with some embodiments, can extend any prior existing latency and jitter measurement techniques to conduct measurements on a per-queue and per tunnel/path level. For example, the below latency measurement technique can be used on a per-queue and per tunnel/path level in some embodiments.

In the example latency measurement technique, T1 represents an outbound packet send time at a first (local) device, R1 represents an outbound packet receive time at a second (peer) device, T2 represents a return packet send time at the second (peer) device, and R2 represents a return packet receive time at the first (local) device. Furthermore, "Delta" represents a delay at the second (peer) device between R1 and T2, and "Delay" represents a sending delay at the first (local) device. A latency or round-trip time (RTT) measurement can be calculated as:

$$\text{Latency } (RTT) = (R2 - T2) + (R1 - T1)$$
$$= (R2 - T1) - (T2 - R1)$$
$$= (R2 - T1) - \text{Delta}$$
$$= R2 - (T1 + \text{Delta})$$
$$= R2 - \text{Delay}$$

The below example jitter measurement technique can be used on a per-queue and per tunnel/path level in some embodiments. In the example jitter measurement technique, T1 represents a first outbound packet send time at a second (peer) device, and R1 represents a first outbound packet receive time at a first (local) device. Furthermore, T2 represents a second outbound packet send time at the second (peer) device, and R2 represents a second outbound packet receive time at the first (local) device. T3 represents a third outbound packet send time at the second (peer) device, and R3 represents a third outbound packet receive time at the first (local) device. First and second jitter measurements can be calculated as:

$$\text{First Jitter} = |(R2 - R1) - (T2 - T1)|$$
$$\text{Second Jitter} = |(R3 - R2) - (T3 - T2)|$$

For both latency (RTT) and jitter, an inline data packet can be sampled at a per queue level, and the packet will carry timestamps in its metadata header. The time stamps can be maintained at a per-tunnel and per-queue level, on peer and local endpoints. These timestamps can be used to calculate RTT and jitter. With smaller sampling intervals, embodiments can acquire larger number of samples for RTT, and can thereby achieve better accuracy. One-way jitter can be periodically reported to the peer, e.g., via a bidirectional forwarding detection (BFD) echo function in a new tag-length-value (TLV) header. Embodiments of this disclosure can extend to BFD per class probe packets, which can help to measure metrics when there is no inline data for a given queue.

After measuring per-queue performance metrics such as loss, latency, and jitter, embodiments of this disclosure can map the per-queue performance metrics to SLAs. For loss measurements, with local-loss and wan-loss measured separately as explained herein, this disclosure provides a method to map local-loss and wan-loss measurements to SLA classes, for accurate per class loss metric measurement.

SLAs are configured with associated queues and DSCPs. The local-loss of a queue can be directly mapped to SLA. However, the WAN loss relates to DSCP, as it is based on a provider service level, so if there are multiple queues configured with a same DSCP, then the WAN loss of each of those queues can be combined, e.g., by averaging or other mathematical combination, prior to mapping to an SLA.

Embodiments of this disclosure can furthermore map per-queue latency and jitter performance metrics to SLA classes. There are two scenarios in which per-queue level latency/jitter metrics can be mapped to SLA classes differently. In a first scenario, an SLA class may be configured with app-probe-class data. In this case, the latency/jitter of a queue can be mapped to the SLA that is configured to use that queue. In a second scenario, an SLA class may not be configured with app-probe-class data. In this case, a combined latency/jitter performance measurement, e.g., an average latency/jitter of all the queues, can be mapped to all the SLA classes, resulting in all or multiple SLA's using tunnel a same set of level latency/jitter measurements.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
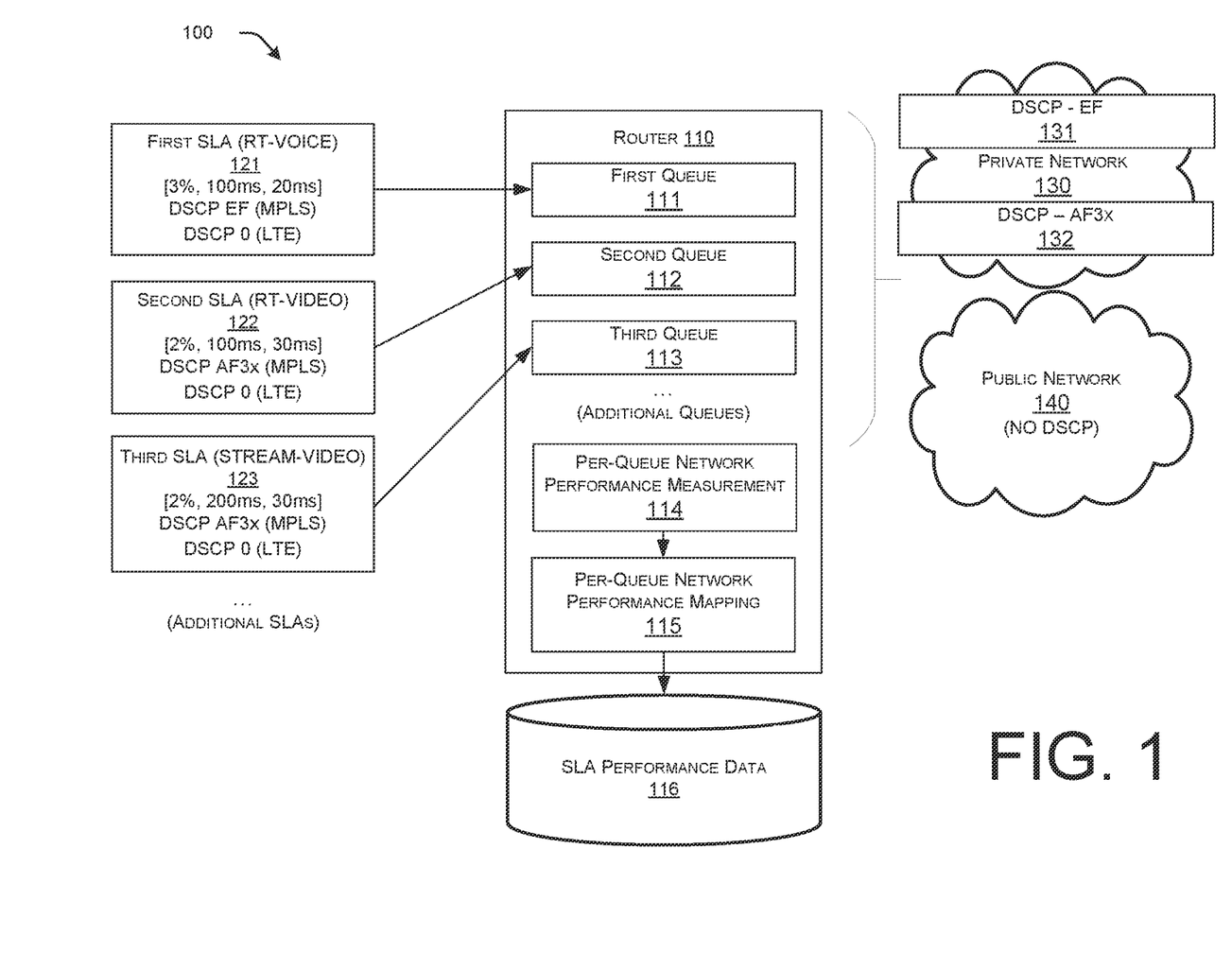
FIG. 1 illustrates an example router configured with different queues, wherein the router is equipped to perform per-queue network performance mapping, in accordance with various aspects of the technologies disclosed herein.

FIG. 1 illustrates an example router configured with different queues, wherein the router is equipped to perform per-queue network performance mapping, in accordance with various aspects of the technologies disclosed herein. FIG. 1 illustrates an architecture 100 comprising a router 110, example SLAs including a first SLA 121, a second SLA 122, and a third SLA 123, SLA performance data 116, a private network 130 and a public network 140. The router 110 comprises different example queues, including a first queue 111, a second queue 112, and a third queue 113. The router 110 further comprises per-queue network performance measurement 114 and per-queue network performance mapping 115. The private network 130 supports the use of different DSCPs including DSCP-EF 131 and DSCP-AF3x 132. The public network 140 does not support the use of different DSCPs.

The example SLAs, including first SLA 121, second SLA 122, and third SLA 123 are illustrated with different class indications, performance thresholds, and QoS parameters. The first SLA 121 is an RT-Voice SLA with a 3% loss threshold, a 100 ms latency threshold, and a 20 ms jitter threshold. Furthermore, for QoS, the first SLA 121 has a DSCP value of DSCP-EF for MPLS networks such as the private network 130, and the first SLA 121 has a DSCP value of DSCP-0 for long term evolution (LTE) networks such as the public network 140. The second SLA 122 is an RT-Video SLA with a 2% loss threshold, a 100 ms latency threshold, and a 30 ms jitter threshold. Furthermore, for QoS, the second SLA 122 has a DSCP value of DSCP-AF3x for MPLS networks such as the private network 130, and the second SLA 122 has a DSCP value of DSCP-0 for LTE networks such as the public network 140. The third SLA 123 is a Stream-Video SLA with a 2% loss threshold, a 200 ms latency threshold, and a 30 ms jitter threshold. Furthermore, for QoS, the third SLA 123 has a DSCP value of DSCP-AF3x for MPLS networks such as the private network 130, and the third SLA 123 has a DSCP value of DSCP-0 for LTE networks such as the public network 140. The first SLA 121 is assigned to use the first queue 111, the second SLA 122 is assigned to use the second queue 112, and the third SLA 123 is assigned to use the third queue 113.

It can be observed in FIG. 1 that there is only one SLA, the first SLA 121, which uses the DSCP-EF for MPLS. In contrast, there are multiple SLAs, namely the second SLA 122 and the third SLA 123, which use the DSCP-AF3x for MPLS. Any of the SLAs can use DSCP-0 for LTE. Thus, there are multiple different performance measurement scenarios. In a "private network one-to-one" scenario, as observed for the first SLA 121 in FIG. 1, a single SLA (the first SLA 121) uses a single DSCP (DSCP-EF). In a "private network one-to-multiple" scenario, as observed for the second SLA 122 and third SLA 123 in FIG. 1, multiple SLAs (the second SLA 122 and the third SLA 123) use a single DSCP (DSCP-AF3x), and therefore the single DSCP is used at multiple queues 112, 113. In a "public network" scenario, when sending traffic via the public network 140, multiple SLAs including first SLA 121, second SLA 122, and third SLA 123 use a single DSCP (DSCP-0). Embodiments of this disclosure can be configured to detect an applicable scenario and determine per-queue performance metrics for the detected scenario. Embodiments of this disclosure can furthermore be configured determine different per-queue performance metrics for different detected scenarios.

In FIG. 1, the per-queue network performance measurement 114 can be configured to measure different performance parameters such as loss, latency and jitter for each queue 111, 112, 113, as well as for the WAN channels such as the public network 140 and the DSCP-EF 131 and DSCP-AF3x 132 of the private network 130. The per-queue network performance mapping 115 can be configured to map performance measurements to SLA classes, e.g., to the first SLA 121, second SLA 122, and third SLA 123, by storing performance measurements in the SLA performance data 116.

In the illustrated example, there are three SLA classes mapped to three queues, with two different DSCP values (EF and AF3x) in use on an MPLS circuit, and with no DSCP service (DSCP 0) on the public circuit. For the MPLS circuit tunnels, the second SLA 122 and the third SLA 123 are mapped to the second queue 112 and the third queue 113 respectively, but the second SLA 122 and the third SLA 123 use a same DSCP value (AF3x). Since the second SLA 122 and the third SLA 123 use the same DSCP value (AF3x), the probability of dropping a packet in a WAN network will be same for both SLAs 122, 123. Therefore, for SLAs 122, 123, the wan-loss measured on both the second queue 112 and the third queue 113 can be considered, which provides a more accurate measurement even if different rates of traffic and corresponding performance are experienced at any given time.

In order to map per-queue level loss metrics to SLAs on private circuits, e.g., on MPLS circuit tunnels in a one-to-one scenario, the WAN loss of a queue can be combined with the local loss of the queue, and the resulting combined loss can be mapped to the SLA. For example, with reference to FIG. 1, for the first SLA 121, the combined private circuit loss metric can comprise the measured wan-loss of the first queue 111 (due to DSCP-EF) plus the measured local-loss of the first queue 111.

In order to map per-queue level loss metrics to SLAs on private circuits, e.g., on MPLS circuit tunnels in a one-to-multiple scenario, a combined WAN loss of queues using a same DSCP can be combined with the local loss of a queue, and the resulting combined loss can be mapped to the SLA. For example, with reference to FIG. 1, for the second SLA 122, the combined private circuit loss metric can comprise the average wan-loss of the second queue 112 and the third queue 113 (due to DSCP-AF3x) plus the measured local-loss of the second queue 112. For the third SLA 123, the combined private circuit loss metric can comprise the average wan-loss of the second queue 112 and the third queue 113 (due to DSCP-AF3x) plus the measured local-loss of the third queue 113.

On a public circuit, such as the public network 140, since there is no differentiated class of service, the possibility of a packet being dropped in the provider network is the same for all classes of traffic. So, on public circuit tunnels, techniques provided herein can consider the combined wan-loss of all the queues 111, 112, 113 for all SLA classes.

In order to map per-queue level loss metrics to SLAs on public circuits, e.g., on LTE circuit tunnels, a combined public circuit WAN loss of all queues can be combined with the local loss of a queue, and the resulting combined loss can be mapped to the SLA. For example, with reference to FIG. 1, for the first SLA 121, the combined public circuit loss metric can comprise the average wan-loss of the first queue 111, the second queue 112, the third queue 113, and any additional queues, plus the measured local-loss of the first queue 111. For the second SLA 122, the combined public circuit loss metric can comprise the average wan-loss of the first queue 111, the second queue 112, the third queue 113, and any additional queues, plus the measured local-loss of the second queue 112. For the third SLA 123, the combined public circuit loss metric can comprise the average wan-loss of the first queue 111, the second queue 112, the third queue 113, and any additional queues, plus the measured local-loss of the third queue 113.

In order to map per-queue level latency and/or jitter metrics to SLAs, there are two scenarios to consider, and therefore the per-queue network performance mapping 115 can be configured to determine an applicable scenario, and then apply a corresponding performance metric mapping technique. In a first scenario, an SLA class is configured with app-probe-class information. In a second scenario, the SLA class is not configured with app-probe-class information.

In the first scenario, (SLA class is configured with app-probe-class information), the per-queue network performance mapping 115 can be configured to map latency and/or jitter measurements of a queue to a corresponding SLA. For example, with reference to FIG. 1, a latency and/or jitter measurement of the first queue 111 can be mapped to first SLA 121. A latency and/or jitter measurement of the second queue 112 can be mapped to second SLA 122. A latency and/or jitter measurement of the third queue 113 can be mapped to third SLA 123.

In the second scenario, (SLA class is not configured with app-probe-class information), the per-queue network performance mapping 115 can be configured to map an average or other combined latency and/or jitter measurement, across multiple queues or all queues, to multiple SLAs or all SLAs. In other words, all SLA's can use tunnel level latency/jitter measurements. For example, with reference to FIG. 1, an average latency and/or jitter measurement across the first queue 111, second queue 112, and third queue 113 can be mapped to the first SLA 121, second SLA 122, and third SLA 123.

Figure 2:
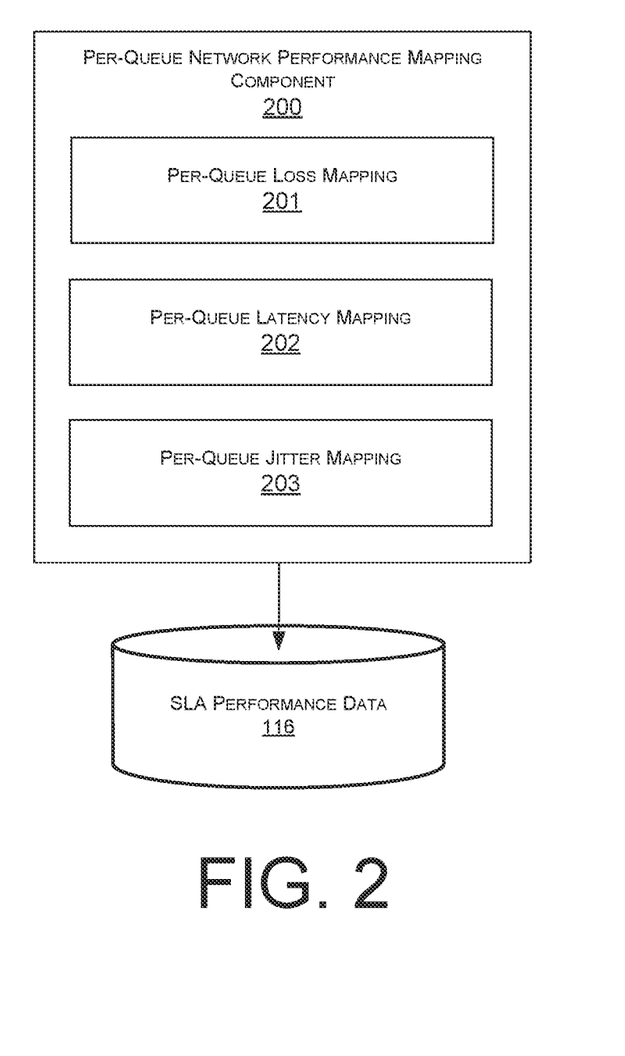
FIG. 2 illustrates an example per-queue network performance mapping component, in accordance with various aspects of the technologies disclosed herein.

FIG. 2 illustrates an example per-queue network performance mapping component, in accordance with various aspects of the technologies disclosed herein. The per-queue network performance mapping component 200 can implement per-queue network performance mapping 115 in some embodiments. The per-queue network performance mapping component 200 comprises per-que loss mapping 201, per-que latency mapping 202, and per-que jitter mapping 203. The per-queue network performance mapping component 200 can output mapping information for storage in SLA performance data 116, as illustrated in FIG. 1.

FIG. 2 illustrates different per-que performance measurement mapping functions, e.g., per-que loss mapping 201, per-que latency mapping 202, and per-que jitter mapping 203, for different types of performance measurements, namely for loss, latency, and jitter measurements. While loss, latency, and jitter are used herein as example performance measurements, embodiments of this disclosure can be extended to apply to other performance measurements as well.

Embodiments such as illustrated in FIG. 2 can be useful, because depending on the type of performance measurement and the scenario, per-queue performance measurement information can be combined differently in order to map the measurement information back to SLA classes, as described above with regard to FIG. 1.

Figure 3:
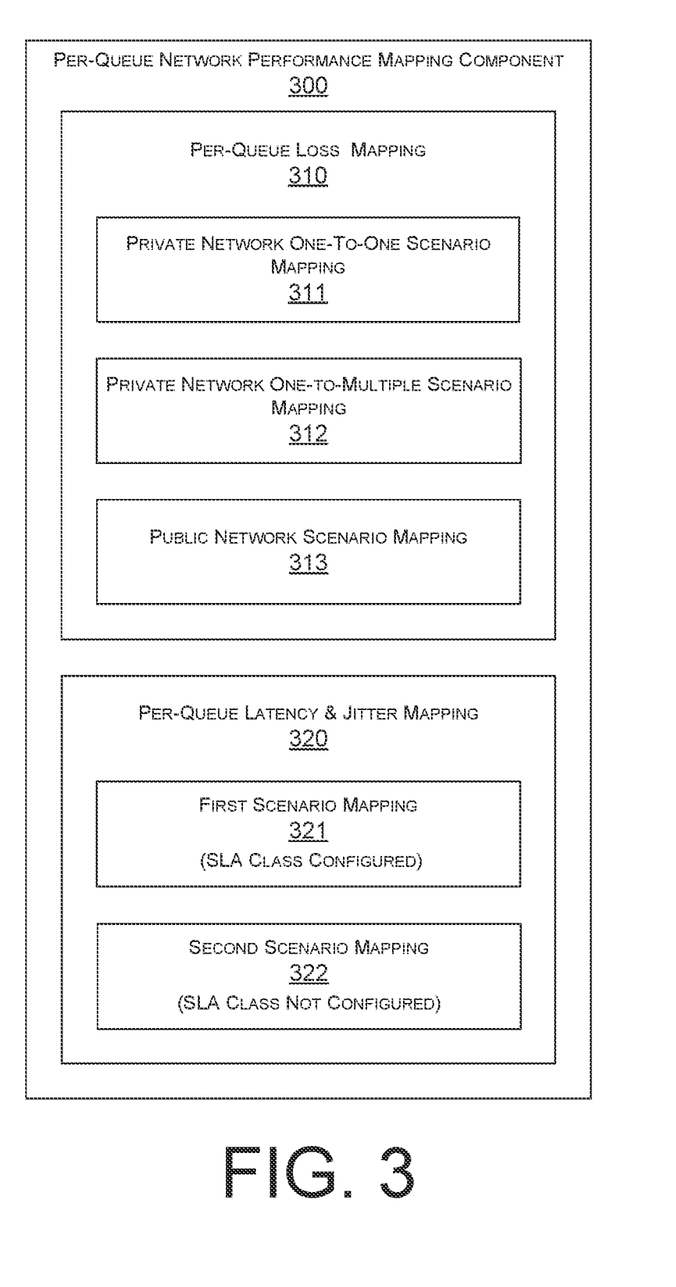
FIG. 3 illustrates another example per-queue network performance mapping component, in accordance with various aspects of the technologies disclosed herein.

In some embodiments, the per-que loss mapping 201 can include different modules for different scenarios, as described further in connection with FIG. 3. Furthermore, in some embodiments, the per-que latency mapping 202 and the per-que jitter mapping 203 can optionally be combined into a single functional unit having several modules for different scenarios, as also described further in connection with FIG. 3.

FIG. 3 illustrates another example per-queue network performance mapping component, in accordance with various aspects of the technologies disclosed herein. The per-queue network performance mapping component 300 can implement per-queue network performance mapping 115 in some embodiments. The per-queue network performance mapping component 300 comprises per-queue loss mapping 310, and per-queue latency and jitter mapping 320. Per-queue loss mapping 310 comprises private network one-to-one scenario mapping 311, private network one-to-multiple scenario mapping 312, and public network scenario mapping 313. Per-queue latency and jitter mapping 320 comprises first scenario mapping 321 and second scenario mapping 322.

Per-queue loss mapping 310 comprises different modules, namely private network one-to-one scenario mapping 311, private network one-to-multiple scenario mapping 312, and public network scenario mapping 313, which are applicable to different scenarios, because measurements may be derived differently in the different scenarios, as described with reference to FIG. 1. Per-queue loss mapping 310 can optionally be configured to employ one or more of the different modules to generate and store different mapping information, e.g., in the SLA performance data 116 illustrated in FIG. 1.

Private network one-to-one scenario mapping 311 can be configured to map per-queue level loss metrics to SLAs on private circuits in one-to-one scenarios, in which one queue uses a DSCP which is not used by other queues. Private network one-to-one scenario mapping 311 can combine the WAN loss of the queue with the local loss of the queue, and the resulting combined loss can be mapped to the SLA that uses the queue.

Private network one-to-multiple scenario mapping 312, can be configured to map per-queue level loss metrics to SLAs on private circuits in one-to-multiple scenarios, in which a same DSCP is used by multiple queues. The combined WAN loss of the multiple queues can be combined with the local loss of one of the queues, and the resulting combined loss can be mapped to the SLA that uses the one of the queues. The combined WAN loss of the multiple queues can comprise, e.g., an average WAN loss or other mathematical combination. The average WAN loss can be combined with the local loss of the one of the queues for example by addition.

Public network scenario mapping 313 can be configured to map per-queue level loss metrics to SLAs on public circuits. Public network scenario mapping 313 can be configured to combine public circuit WAN loss of all queues with the local loss of one of the queues, and the resulting combined loss can be mapped to the SLA that uses the one of the queues. The combined public circuit WAN loss of all queues can comprise, e.g., an average or other mathematical combination. The average or other mathematical combination can be combined with the local loss of the one of the queues for example by addition.

Similar to the per-queue loss mapping 310, the per-queue latency and jitter mapping 320 comprises different modules, e.g., first scenario mapping 321 and the second scenario mapping 322, which are applicable to different scenarios, because measurements may be derived differently in the different scenarios, as described with reference to FIG. 1. Per-queue latency and jitter mapping 320 can optionally be configured to employ one or more of the different modules to generate and store different mapping information, e.g., in the SLA performance data 116 illustrated in FIG. 1.

Per-queue latency and jitter mapping 320 can optionally perform operations for both latency and jitter performance metrics, because the mapping operations for latency and jitter can be similar in the first scenario mapping 321 and the second scenario mapping 322.

First scenario mapping 321 can be applied when per-queue latency and jitter mapping 320 determines that an SLA class is configured with app-probe-class information, i.e., the SLA class is configured as illustrated in FIG. 3. First scenario mapping 321 can be configured to map latency and/or jitter measurements of a queue to a corresponding SLA that uses the queue.

Second scenario mapping 322 can be applied when per-queue latency and jitter mapping 320 determines that an SLA class is not configured with app-probe-class information, i.e., the SLA class is not configured as illustrated in FIG. 3. Second scenario mapping 322 can be configured to map an average or other combined latency and/or jitter measurement, across multiple queues or all queues, to multiple SLAs or all SLAs.

Figure 4:
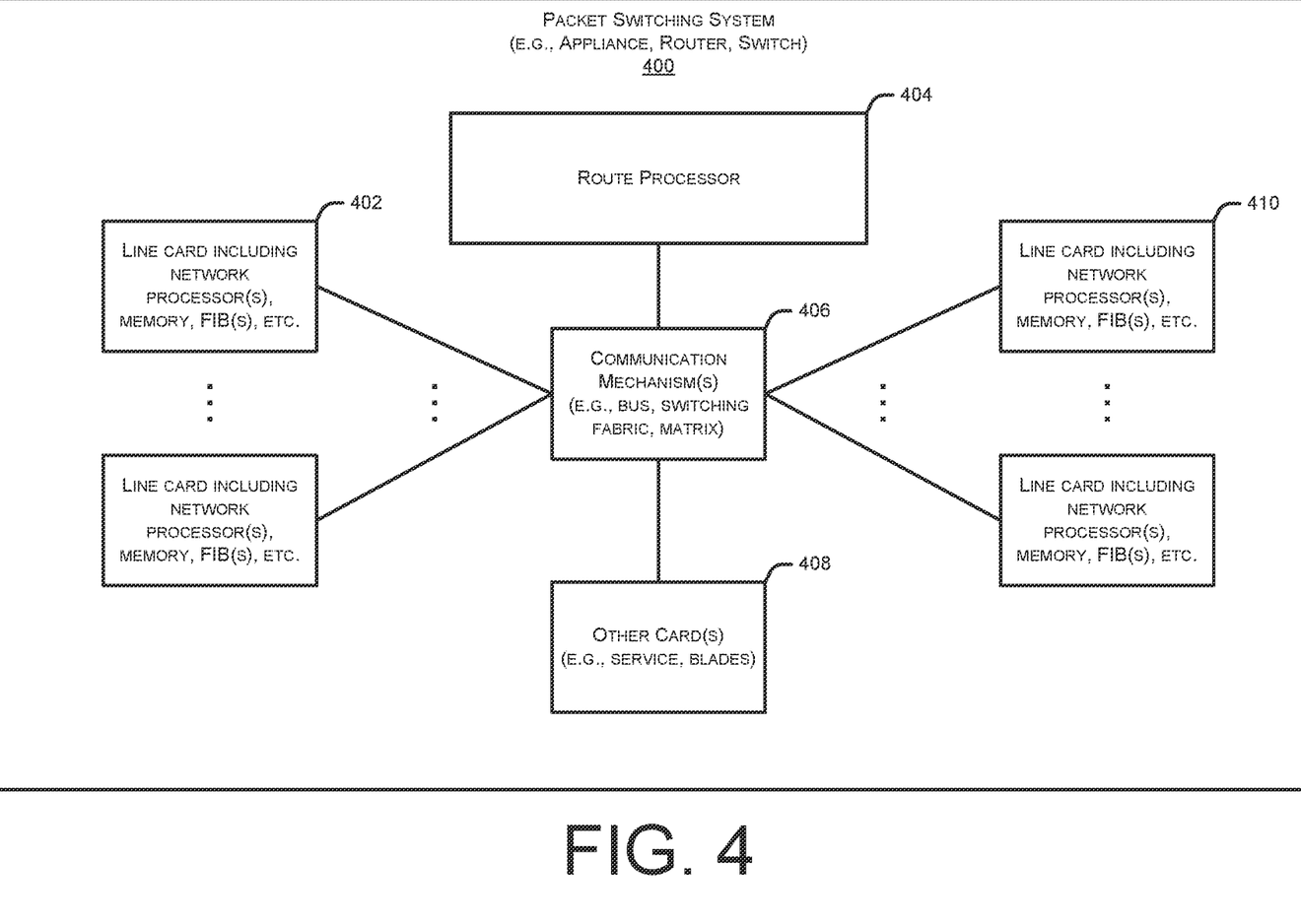
FIG. 4 illustrates an example packet switching system that can be utilized to implement a router or other access point device, in accordance with various aspects of the technologies disclosed herein.

FIG. 4 illustrates an example packet switching system 400 that can be utilized to implement a router or other access point device, in accordance with various aspects of the technologies disclosed herein. In some examples, the packet switching system 400 can be implemented as one or more packet switching device(s). The packet switching system 400 may be employed in a network to process network traffic by receiving and forwarding packets. The illustrated elements of the packet switching system 400 can include, e.g., components introduced in any of FIGS. 1-3 to configure the packet switching system 400 to perform operations according to this disclosure.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 404 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching system 400 may comprise a communication mechanism 406 (e.g., bus, switching fabric, and/or matrix, etc.) for allowing the different entities such as line card(s) 402, 410, route processor 404, and other cards 408 to communicate. The communication mechanism 406 can optionally be hardware-based. Line card(s) 402, 410 may perform the actions of being both an ingress and/or an egress line card with regard to multiple packets and/or packet streams being received by, or sent from, the packet switching system 400.

Figure 5:
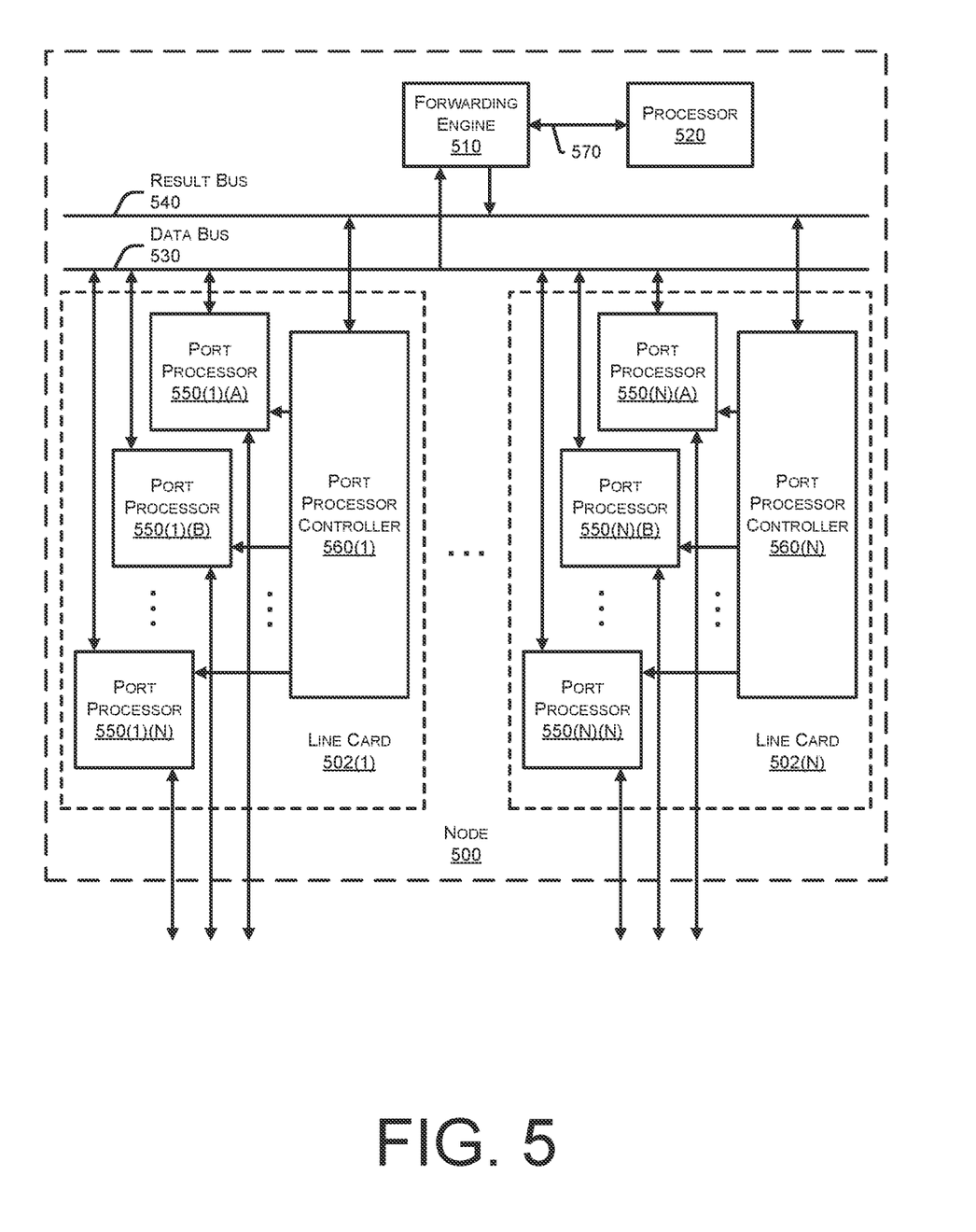
FIG. 5 illustrates an example node that can be utilized to implement a router or other access point device, in accordance with various aspects of the technologies disclosed herein.

FIG. 5 illustrates an example node 500 that can be utilized to implement a router or other access point device, in accordance with various aspects of the technologies disclosed herein. In some examples, node 500 may include any number of line cards 502, e.g., line cards 502(1)-(N), where N may be any integer greater than 1, and wherein the line cards 502 are communicatively coupled to a forwarding engine 510 (also referred to as a packet forwarder) and/or a processor 520 via a data bus 530 and/or a result bus 540. Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively. Additionally, or alternatively, the forwarding engine 510 and/or the processor 520 can be coupled to one another via the data bus 530 and the result bus 540 and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510. For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
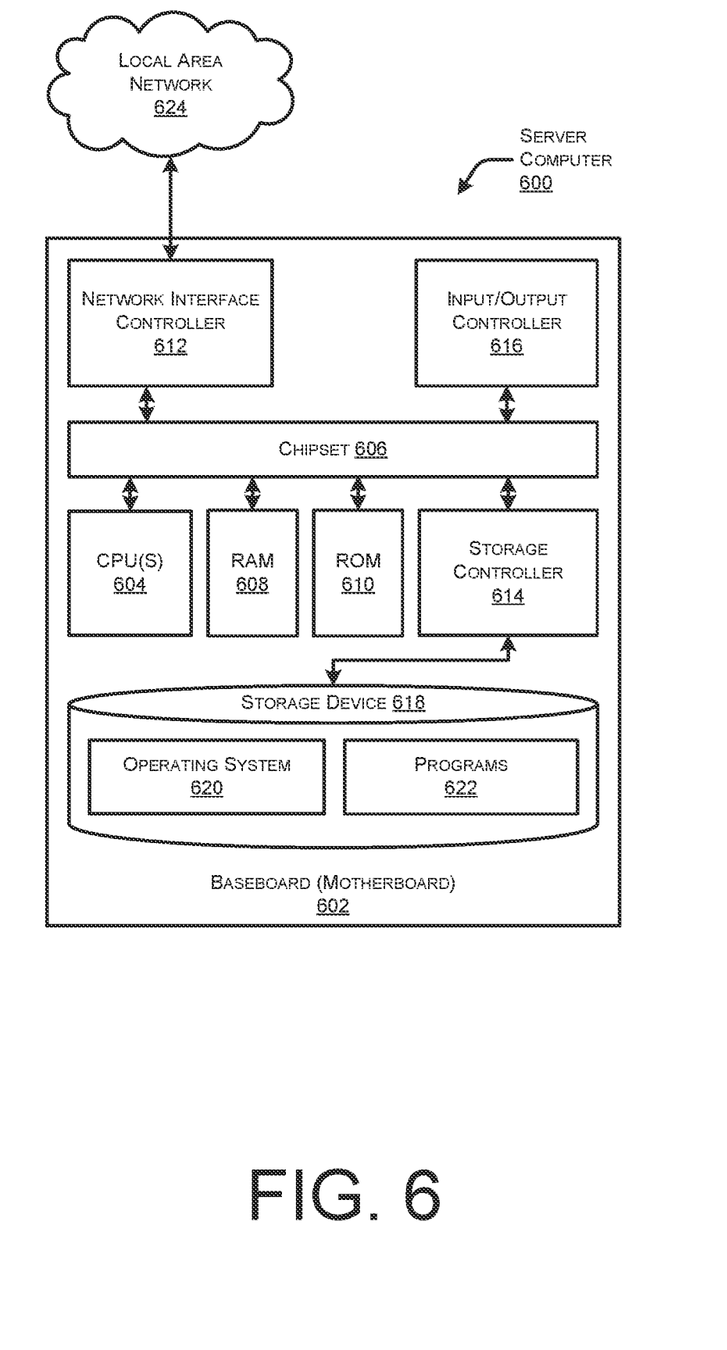
FIG. 6 illustrates an example computer hardware architecture that can implement the techniques disclosed herein, in accordance with various aspects of the technologies disclosed herein.

FIG. 6 illustrates an example computer hardware architecture that can implement the techniques disclosed herein, in accordance with various aspects of the technologies disclosed herein. The computer architecture shown in FIG. 6 illustrates a conventional server computer 600, however the computer architecture can optionally implement any other computing devices such as a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein. The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-3, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above. According to one embodiment, the server computer 600 has access to computer-readable storage media storing computer-executable instructions which, when executed by the server computer 600, perform the various processes described with regard to FIGS. 7 and 8. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
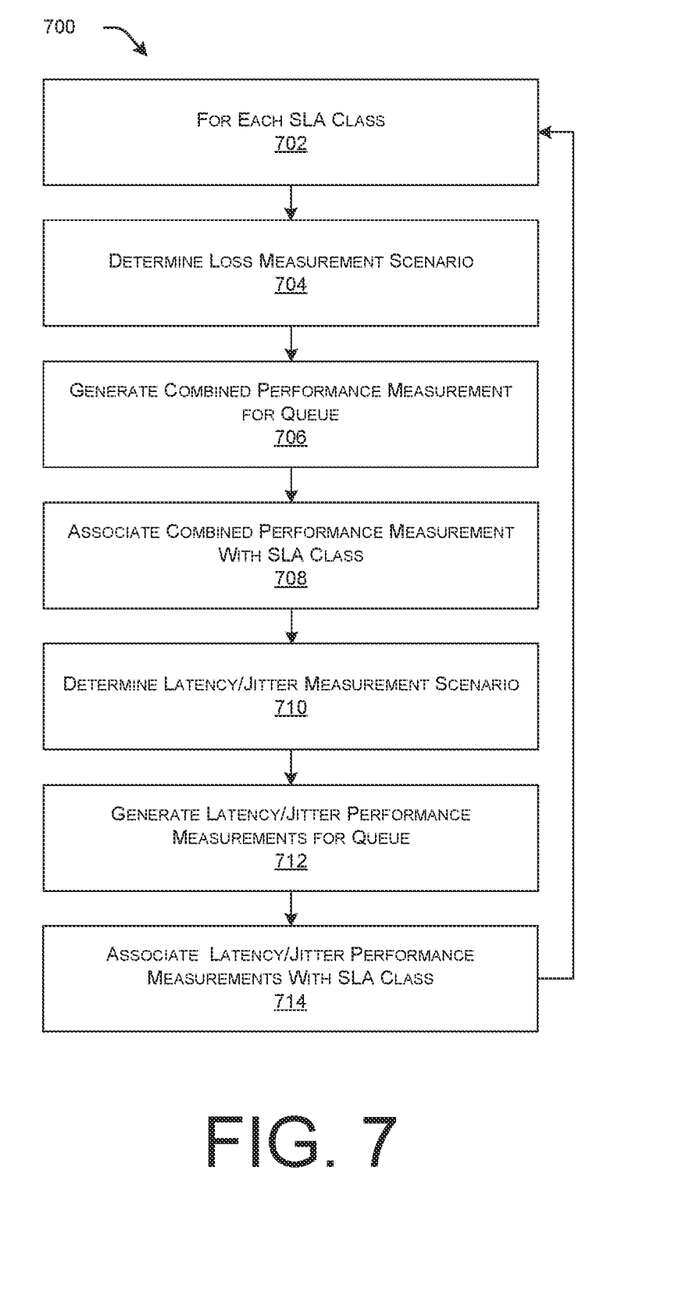
FIG. 7 is a flow diagram that illustrates an example method performed in connection with per-queue network performance mapping, in accordance with various aspects of the technologies disclosed herein.
Figure 8:
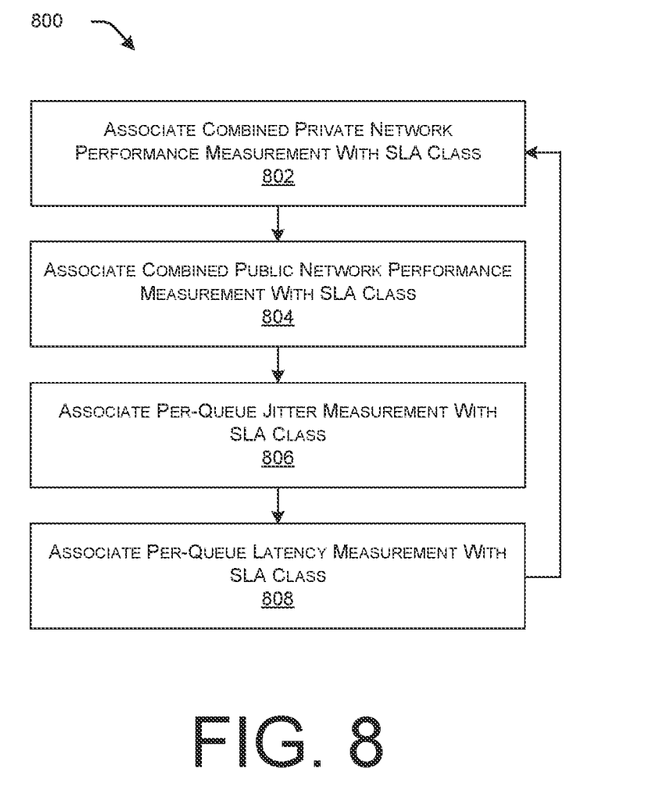
FIG. 8 is a flow diagram that illustrates another example method performed in connection with per-queue network performance mapping, in accordance with various aspects of the technologies disclosed herein.

FIGS. 7-8 are flow diagrams of example methods 700, 800 performed at least partly by a computing device that implements a router, such as the packet switching system 400, the node 500, or the server computer 600. The logical operations described herein with respect to FIGS. 7-8 may be implemented (1) as a sequence of computer-implemented acts or program modules running on a computing system and/or (2) as interconnected machine logic circuits or circuit modules within the computing system. In some examples, the methods 700, 800 may be performed by a system comprising one or more processors and one or more non-transitory computer-readable media storing computer-executable instructions that, when executed by the one or more processors, cause the one or more processors to perform the methods 700, 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 7-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed in connection with per-queue network performance mapping, in accordance with various aspects of the technologies disclosed herein. At operation 702, a router or other device configured according to this disclosure can begin by identifying an SLA class or a queue corresponding thereto. Operations 704-714 may then be performed to map performance measurements to the SLA class, and the method illustrated in FIG. 7 can be repeated for each queue and/or SLA implemented in the router.

Operations 704-708 can be performed in connection with a first performance measurement type, e.g., loss measurements. Operation 704 comprises "determine loss measurement scenario." For example, the router can determine whether a queue is using a public or private network, and if a private network, the router can determine whether the DSCP is one-to-one for the queue, or one-to-multiple.

Operation 706 comprises "generate combined performance measurement for queue." The manner of generating the combined performance measurement can depend on the scenario. In a private network one-to-one scenario in which a first SLA class is configured to use a first DSCP which is processed through a first router queue, a first wide WAN performance measurement associated with the first DSCP can be combined with a first local performance measurement associated with the first router queue, resulting in a first combined performance measurement. In some embodiments, the first combined performance measurement can comprise a first MPLS combined performance measurement applicable to MPLS circuit tunnels.

In a private network one-to-multiple scenario in which a second SLA class is configured to use a second DSCP which is processed through at least a second and a third router queue, a second WAN performance measurement associated with the second DSCP can be combined with a second local performance measurement associated with the second router queue, resulting in a second combined performance measurement. The second WAN performance measurement can comprise a combined WAN performance measurement based on router queues associated with the second DSCP, such as an average WAN performance that is averaged across the router queues associated with the second DSCP. The second combined performance measurement can comprise a second MPLS combined performance measurement applicable to MPLS circuit tunnels.

In a public network scenario, public circuit combined performance measurements can be generated. For example, a first public circuit combined performance measurement (e.g., loss measurement) can comprise a combination of a combined public circuit WAN performance measurement and the first local performance measurement associated with the first router queue. A second public circuit combined performance measurement (e.g., loss measurement) can comprise a combination of the combined public circuit WAN performance measurement and the second local performance measurement associated with the second router queue. The combined public circuit WAN performance measurement can comprise a combination based on at least the first router queue, the second router queue, and the third router queue, e.g., an average public circuit WAN performance across all queues.

Operation 708 comprises "associate combined performance measurement with SLA class." For example, the first combined performance measurement generated at operation 706 can be associated with the first SLA class, the second combined performance measurement can be associated with the second SLA class, and so on for additional combined performance measurements. Additionally, the first public circuit combined performance measurement can be associated with, e.g., the first SLA class, and the second public circuit combined performance measurement can be associated with the second SLA class. The associating can comprise storing information, e.g., in SLA performance data 116, wherein the stored information is associated with an SLA class.

Operations 710-714 can be performed in connection with a second performance measurement type, e.g., latency and/or jitter measurements. Operation 710 comprises "determine latency/jitter measurement scenario." For example, the router can determine whether or not an SLA class is configured with app-probe-class information.

Operation 712 comprises "generate latency/jitter performance measurements for queue." The manner of generating the combined performance measurement can depend on the scenario determined at operation 710. In a configured scenario, operation 712 can apply a queue's latency/jitter performance measurement without further combination or calculation. In a not configured scenario, operation 712 can combine latency/jitter performance measurements for multiple queues, e.g., for all router queues. The combination operation can comprise, e.g., calculating an average jitter measurement across the multiple router queues, e.g., based on the first router queue, the second router queue, and the third router queue.

Operation 714 comprises "associate latency/jitter performance measurements with SLA class." In a configured scenario, operation 714 can comprise, e.g., associating a first jitter measurement with a first SLA class, wherein the first jitter measurement is associated with a first router queue, and associating a second jitter measurement with a second SLA class, wherein the second jitter measurement is associated with a second router queue. Operation 714 can further comprise associating a first latency measurement with the first SLA class, wherein the first latency measurement is associated with the first router queue and associating a second latency measurement with the second SLA class, wherein the second latency measurement is associated with the second router queue. In a not configured scenario, operation 714 can comprise, e.g., associating an average jitter measurement with the first SLA class and the second SLA class, wherein the average jitter measurement is based on multiple router queues such as the first router queue, the second router queue, and the third router queue. Operation 714 can further comprise associating an average latency measurement with the first SLA class and the second SLA class, wherein the average latency measurement is also based on the multiple router queues such as the first router queue, the second router queue, and the third router queue.

FIG. 8 is a flow diagram that illustrates another example method performed in connection with per-queue network performance mapping, in accordance with various aspects of the technologies disclosed herein. The illustrated operations 802-808 can be performed to map performance measurements to an SLA class, and the method illustrated in FIG. 8 can be repeated for each queue and/or SLA implemented in a router.

At operation 802, the router or other device configured according to this disclosure can associate a combined private network performance measurement with an SLA class. The combined private network performance measurement can comprise a combination of WAN-loss and local-loss at a queue, and the SLA can comprise an SLA that is configured to use the queue. The WAN loss can optionally comprise an average WAN loss, wherein the average incorporates WAN loss at one or more other queues, according to scenarios described herein.

At operation 804, the router or other device configured according to this disclosure can associate a combined public network performance measurement with an SLA class. The combined public network performance measurement can comprise a combination of WAN-loss and local-loss at a queue, and the SLA can comprise an SLA that is configured to use the queue. The WAN loss can optionally comprise an average public network WAN loss, wherein the average incorporates WAN loss at one or more other queues, according to scenarios described herein.

At operation 806, the router or other device configured according to this disclosure can associate a per-queue jitter measurement with an SLA class. The per-queue jitter measurement can comprise either a jitter measurement at a single queue, or an average jitter measurement across multiple queues, according to scenarios described herein. The SLA class can comprise an SLA that is configured to use the queue.

At operation 808, the router or other device configured according to this disclosure can associate a per-queue latency measurement with an SLA class. The per-queue latency measurement can comprise either a latency measurement at a single queue, or an average latency measurement across multiple queues, according to scenarios described herein. The SLA class can comprise an SLA that is configured to use the queue.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method to associate network performance at multiple different router queues with service level agreement (SLA) classes configured to use the router queues, comprising:
for a first SLA class that is configured to use a first differentiated services code point (DSCP) which is processed through a first router queue of a router comprising multiple router queues, combining a wide area network (WAN) performance measurement associated with the first DSCP with a first local performance measurement associated with the first router queue, resulting in a first combined performance measurement;
associating the first combined performance measurement with the first SLA class;
generating a second combined performance measurement for a second SLA class that is configured to use a second DSCP which is processed through at least a second and a third router queue of the router, the second combined performance measurement comprising a combination of:
an average WAN performance measurement associated with the second DSCP, wherein the average WAN performance measurement is based on WAN performance measurements associated with each of multiple router queues associated with the second DSCP, the multiple router queues comprising at least the second and the third router queue; and
a second local performance measurement associated with the second router queue;
associating the second combined performance measurement with the second SLA class; and
associating an average jitter measurement with the first SLA class and the second SLA class, wherein the average jitter measurement is based on at least the first router queue, the second router queue, and the third router queue.

2. The method of claim 1, wherein the WAN performance measurement, the first local performance measurement associated with the first router queue, the average WAN performance measurement, and the second local performance measurement comprise loss measurements.

3. The method of claim 1, wherein the first combined performance measurement comprises a first multiprotocol label switching (MPLS) combined performance measurement applicable to MPLS circuit tunnels, and wherein the second combined performance measurement comprises a second MPLS combined performance measurement applicable to MPLS circuit tunnels.

4. The method of claim 3, further comprising:
associating a first public circuit combined performance measurement with the first SLA class; and
associating a second public circuit combined performance measurement with the second SLA class.

5. The method of claim 4, wherein:
the first public circuit combined performance measurement comprises a combination of a combined public circuit WAN performance measurement and the first local performance measurement,
the second public circuit combined performance measurement comprises a combination of the combined public circuit WAN performance measurement and the second local performance measurement, and
the combined public circuit WAN performance measurement comprises a combination based on at least the first router queue, the second router queue, and the third router queue.

6. The method of claim 1, further comprising:
associating a first jitter measurement with the first SLA class, wherein the first jitter measurement is associated with the first router queue; and
associating a second jitter measurement with the second SLA class, wherein the second jitter measurement is associated with the second router queue.

7. The method of claim 1, further comprising:
associating a first latency measurement with the first SLA class, wherein the first latency measurement is associated with the first router queue; and
associating a second latency measurement with the second SLA class, wherein the second latency measurement is associated with the second router queue.

8. The method of claim 1, further comprising:
associating an average latency measurement with the first SLA class and the second SLA class, wherein the average latency measurement is based on at least the first router queue, the second router queue, and the third router queue.

9. A device comprising:
one or more processors;
one or more non-transitory computer-readable media storing computer-executable instructions that, when executed by the one or more processors, cause the one or more processors to perform operations comprising:
for a first SLA class that is configured to use a first differentiated services code point (DSCP) which is processed through a first router queue of a router comprising multiple router queues, combining a wide area network (WAN) performance measurement associated with the first DSCP with a first local performance measurement associated with the first router queue, resulting in a first combined performance measurement;
associating the first combined performance measurement with the first SLA class;
generating a second combined performance measurement for a second SLA class that is configured to use a second DSCP which is processed through at least a second and a third router queue of the router, the second combined performance measurement comprising a combination of:
an average WAN performance measurement associated with the second DSCP, wherein the average WAN performance measurement is based on WAN performance measurements associated with each of multiple router queues associated with the second DSCP, the multiple router queues comprising at least the second and the third router queue; and a second local performance measurement associated with the second router queue;

associating the second combined performance measurement with the second SLA class; and associating an average jitter measurement with the first SLA class and the second SLA class, wherein the average jitter measurement is based on at least the first router queue, the second router queue, and the third router queue.

10. The device of claim 9, wherein the WAN performance measurement, the first local performance measurement associated with the first router queue, the average WAN performance measurement, and the second local performance measurement comprise loss measurements.

11. The device of claim 9, wherein the first combined performance measurement comprises a first multiprotocol label switching (MPLS) combined performance measurement applicable to MPLS circuit tunnels, and wherein the second combined performance measurement comprises a second MPLS combined performance measurement applicable to MPLS circuit tunnels.

12. The device of claim 11, wherein the operations further comprise:
associating a first public circuit combined performance measurement with the first SLA class; and
associating a second public circuit combined performance measurement with the second SLA class.

13. The device of claim 12, wherein:
the first public circuit combined performance measurement comprises a combination of a combined public circuit WAN performance measurement and the first local performance measurement,
the second public circuit combined performance measurement comprises a combination of the combined public circuit WAN performance measurement and the second local performance measurement, and
the combined public circuit WAN performance measurement comprises a combination based on at least the first router queue, the second router queue, and the third router queue.

14. The device of claim 9, wherein the operations further comprise:
associating a first jitter measurement with the first SLA class, wherein the first jitter measurement is associated with the first router queue; and
associating a second jitter measurement with the second SLA class, wherein the second jitter measurement is associated with the second router queue.

15. The device of claim 9, wherein the operations further comprise:
associating a first latency measurement with the first SLA class, wherein the first latency measurement is associated with the first router queue; and
associating a second latency measurement with the second SLA class, wherein the second latency measurement is associated with the second router queue.

16. The device of claim 9, wherein the operations further comprise:
associating an average latency measurement with the first SLA class and the second SLA class, wherein the average latency measurement is based on at least the first router queue, the second router queue, and the third router queue.

17. A method comprising:
associating at least two first network performance measurements with a first SLA class, the at least two first network performance measurements comprising:
a first combined private network performance measurement, wherein the first combined private network performance measurement comprises a combination of a first wide area network (WAN) performance measurement and a first local performance measurement associated with a first router queue of a router comprising multiple router queues; and
a first combined public network performance measurement, wherein the first combined public network performance measurement comprises a combination of a public WAN performance measurement and the first local performance measurement;
associating at least two second network performance measurements with a second SLA class, the at least two second network performance measurements comprising:
a second combined private network performance measurement, wherein the second combined private network performance measurement comprises a combination of a second WAN performance measurement and a second local performance measurement associated with a second router queue of the router; and
a second combined public network performance measurement, wherein the second combined public network performance measurement comprises a combination of the public WAN performance measurement and the second local performance measurement; and
associating an average jitter measurement with the first SLA class and the second SLA class, wherein the average jitter measurement is based on at least the first router queue and the second router queue.

18. The method of claim 17, wherein the public WAN performance measurement comprises a combination of WAN performance measurements based on at least the first router queue and the second router queue.

19. The method of claim 17, wherein the second WAN performance measurement comprises a combination of WAN performance measurements based on at least the first router queue and the second router queue.

20. The method of claim 17, wherein the first WAN performance measurement and the second WAN performance measurement comprise measurements of a private multiprotocol label switching (MPLS) network.

* * * * *